US012684107B2

(12) United States Patent
Dell

(10) Patent No.: US 12,684,107 B2
(45) Date of Patent: Jul. 14, 2026

(54) THREE-DIMENSIONAL IMAGE DISPLAY SYSTEM

(71) Applicant: AXIOM HOLOGRAPHICS PTY LTD, Queensland (AU)

(72) Inventor: Bruce Robert Dell, Murarrie (AU)

(73) Assignee: AXIOM HOLOGRAPHICS PTY LTD, Queensland (AU)

( * ) Notice: Subject to any disclaimer, the term of this patent is extended or adjusted under 35 U.S.C. 154(b) by 0 days.

(21) Appl. No.: 18/719,621

(22) PCT Filed: Dec. 15, 2022

(86) PCT No.: PCT/AU2022/051514
§ 371 (c)(1),
(2) Date: Jun. 13, 2024

(87) PCT Pub. No.: WO2023/108222
PCT Pub. Date: Jun. 22, 2023

(65) Prior Publication Data
US 2025/0047829 A1    Feb. 6, 2025

(30) Foreign Application Priority Data

Dec. 15, 2021    (AU) ................................ 2021904072
Aug. 5, 2022    (AU) ................................ 2022902204

(51) Int. Cl.
*H04N 13/368*        (2018.01)
*H04N 13/334*        (2018.01)
(Continued)

(52) U.S. Cl.
CPC ......... *H04N 13/368* (2018.05); *H04N 13/334* (2018.05); *H04N 13/344* (2018.05); *H04N 13/363* (2018.05); *H04N 13/398* (2018.05)

(58) Field of Classification Search
CPC .. H04N 13/117; H04N 13/332; H04N 13/334; H04N 13/344; H04N 13/363; H04N 13/368; H04N 13/398; H04N 9/3147
(Continued)

(56) References Cited

U.S. PATENT DOCUMENTS 5,781,229 A * 7/1998 Zediker ................ H04N 13/363
                                                348/E13.058
11,009,889 B2 5/2021 Jia et al.
(Continued)

FOREIGN PATENT DOCUMENTS

AU        2018303842 A1 * 3/2020 ........... H04N 9/3147
CN        110277032 B    11/2021
(Continued)

OTHER PUBLICATIONS

International Search Report from corresponding PCT Application No. PCT/AU2022/051514, Feb. 24, 2023.
(Continued)

*Primary Examiner* — Behrooz M Senfi
(74) *Attorney, Agent, or Firm* — Workman Nydegger

(57)        ABSTRACT
A three-dimensional stereoscopic image display system comprising an observer position guide configured to guide an observer wearing stereoscopic three-dimensional glasses to a position to perceive a three-dimensional image based on the position of the observer position guide.

17 Claims, 14 Drawing Sheets

(51) Int. Cl.

| | |
|---|---|
| *H04N 13/344* | (2018.01) |
| *H04N 13/363* | (2018.01) |
| *H04N 13/398* | (2018.01) |

(58) Field of Classification Search
USPC ......................................................... 348/51
See application file for complete search history.

(56) References Cited

U.S. PATENT DOCUMENTS

| | | | |
|---|---|---|---|
| 2013/0127832 A1* | 5/2013 | Lee ...................... | H04N 13/207 |
| | | | 345/419 |
| 2013/0293396 A1 | 11/2013 | Selevan | |
| 2015/0310657 A1* | 10/2015 | Eden ................... | G06F 3/04812 |
| | | | 345/441 |
| 2017/0366805 A1 | 12/2017 | Sevostianov | |

FOREIGN PATENT DOCUMENTS

| | | | | | |
|---|---|---|---|---|---|
| KR | 20070061091 A | * | 6/2007 | ............. | H04N 13/00 |
| TW | 201541382 A | * | 11/2015 | ........... | G06T 1/0028 |
| WO | 2019014718 A1 | | 1/2019 | | |

OTHER PUBLICATIONS

Agrawala, Maneesh et al., "The Two-User Responsive Workbench: Support for Collaboration Through Individual Views of a Shared Space", Proceedings of the 24th Annual Conference on Computer Graphics and Interactive Techniques, ACM Press/Addison-Wesley Publishing Co., Aug. 1, 1997, pp. 327-332.

International Preliminary Report on Patentability from corresponding PCT Application No. PCT/AU2022/051514, Dec. 1, 2023.

Extended European Search Report from Corresponding European Patent Application No. EP22905537.1, Feb. 11, 2025.

* cited by examiner

THREE-DIMENSIONAL IMAGE DISPLAY SYSTEM

TECHNICAL FIELD

The present invention relates to systems, methods and apparatus for a displaying a three-dimensional image to an observer in a known location relative to the three-dimensional image.

BACKGROUND

Any references to methods, apparatus or documents of the prior art are not to be taken as constituting any evidence or admission that they formed, or form part of the common general knowledge.

Humans are drawn to three-dimensional effects and such effects are eye catching and attention gaining so that they are useful for a multitude of purposes where it is advantageous to be able to attract the gaze of people. Such purposes include advertising and marketing displays.

However, three-dimensional display systems can be technically complex and financially prohibitive to install, run and maintain.

Many systems that create a perception of a three-dimensional object require special apparatus for tracking the position of the viewer and that the viewer wears stereoscopic glasses. For example, in PCT/AU2018/050754, there is described a virtual object display system which allows two different users to simultaneously view the same virtual object from different positions. That system makes use of multiple projectors, viewer tracking and customised stereoscopic 3D glasses that are synchronised to a particular projector.

There are also many large projection walls utilised in various scenarios. However, due to skewing, warping and bending of the three-dimensional 3D systems are rarely used in such large scall implementations due to the complexities and difficulties of implementing without the images skewing or warping.

It is an object of the present invention to provide a three-dimensional image display system that can be viewed by an observer moving relative to the three-dimensional image.

SUMMARY OF INVENTION

In an aspect, the invention provides a three-dimensional image display system, the display system comprising:

an observer position guide configured to guide an observer to a position to perceive a three-dimensional image, wherein the observer position guide moves along a path;

an image display assembly arranged to display stereoscopic three-dimensional images on a viewing surface;

a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display the stereoscopic three-dimensional images synchronised to a current position of the observer position guide such that the observer wearing the pair of stereoscopic three-dimensional glasses while moving about the stereoscopic three-dimensional images and being adjacent the current position of the observer position guide perceives the stereoscopic three-dimensional image displayed by the image display assembly on the viewing surface.

Preferably, the image display assembly comprises a projector assembly. Alternatively, or additionally, the image display assembly comprises a display panel. Preferably, the display panel comprises an LED display or LED panel configured to display stereoscopic three-dimensional images.

In an aspect, the invention provides a three-dimensional image display system, the display system comprising:

an observer position guide configured to guide an observer to a position to perceive a three-dimensional image, wherein the observer position guide moves along a path;

a projector assembly arranged to project stereoscopic three-dimensional images onto a viewing surface;

a pair of stereoscopic three-dimensional glasses worn by the observer to perceive the stereoscopic three-dimensional images projected by the projector assembly onto the viewing surface; and an image generation assembly coupled to the projector assembly, the image generation assembly configured to control the projector assembly to project the stereoscopic three-dimensional images onto the viewing surface synchronised to a current position of the observer position guide such that the observer wearing the pair of stereoscopic three-dimensional glasses while moving about the stereoscopic three-dimensional images and being adjacent the current position of the observer position guide perceives the stereoscopic three-dimensional image generated by the projector assembly.

Preferably, the observer position guide comprises a plurality of lights arranged along the path, wherein the plurality of lights are illuminated in a sequence to indicate the path the observer is to follow. Preferably, the observer position guide comprises a strip of light emitting diodes or a plurality of light emitting diodes.

In some alternative embodiments, the observer position guide comprises a moving object configured to move along the path and guide the observer. Preferably, the moving object comprises a moving vehicle or robot configured to move along the path and guide the observer.

Preferably, the image display assembly comprises a plurality of display panels.

Preferably, the projector assembly comprises a plurality of projectors. Preferably, the system comprises a plurality of pairs of 3D stereoscopic glasses corresponding to the plurality of projectors.

Preferably, the system further comprises an image separation arrangement to present images from each projector to a corresponding pair of three-dimensional stereoscopic glasses whereby an observer using one of the pairs of three-dimensional stereoscopic glasses sees images emanating from a corresponding projector only.

Preferably the image separation arrangement includes two or more filters for separating images from the plurality of projectors wherein the different viewing filters have different visible light spectral transmission characteristics. In a preferred embodiment of the invention the filters comprise interference filters. For example, the filters may comprise films of dichroic material.

Preferably the filters of the image separation arrangement comprise corresponding viewer and projector interference filters, wherein a viewer interference filter is mounted to the stereo 3D glasses for the user and projector interference filters are mounted to projectors of the corresponding set of projectors.

In another aspect, the invention provides a method for displaying a three-dimensional image, the method comprising:

providing an observer position guide which moves along a path and indicates a position for an observer to see a three-dimensional image displayed by an image display assembly on a viewing surface;

providing a pair of stereoscopic three-dimensional glasses to be worn by the observer to perceive stereoscopic three-dimensional images displayed by the image display assembly on the viewing surface; and displaying three-dimensional images on the viewing surface, wherein the three-dimensional images displayed on the viewing surface are synchronised to a current position of the observer position guide such that the observer wearing the pair of stereoscopic 3D glasses while moving about the three-dimensional images and being adjacent the current position of the observer position guide sees the three-dimensional image displayed by the image display assembly.

In another aspect, the invention provides a method for displaying a three-dimensional image, the method comprising:

providing an observer position guide which moves along a path and indicates a position for an observer to see a three-dimensional image generated by a projector assembly on a viewing surface;

providing a pair of stereoscopic three-dimensional glasses to be worn by the observer to perceive stereoscopic three-dimensional images projected by the projector assembly onto the viewing surface; and projecting three-dimensional images onto the viewing surface, wherein the three-dimensional images projected onto the viewing surface are synchronised to a current position of the observer position guide such that the observer wearing the pair of stereoscopic 3D glasses while moving about the three-dimensional images and being adjacent the current position of the observer position guide sees the three-dimensional image generated by the projector assembly.

In an aspect, the invention provides a stereoscopic three-dimensional image display system comprising an observer position guide configured to guide an observer wearing stereoscopic three-dimensional glasses to a position to perceive a three-dimensional image, wherein the observer position guide moves along a path.

In an aspect, the invention provides a three-dimensional image display system, the display system comprising:

an observer position guide configured to guide an observer to a position to perceive a three-dimensional image;

an image display assembly arranged to display stereoscopic three-dimensional images on a viewing surface;

a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display the stereoscopic three-dimensional images synchronised to a current position of the observer position guide such that the observer wearing the pair of stereoscopic three-dimensional glasses being adjacent the current position of the observer position guide perceives the stereoscopic three-dimensional image displayed by the image display assembly on the viewing surface.

In another aspect, the invention provides a three-dimensional image display system, the display system comprising:

an observer position guide configured to guide an observer to a position to perceive a three-dimensional image;

an image display assembly arranged to display stereoscopic three-dimensional images on a viewing surface;

a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display a stereoscopic three-dimensional image on the viewing surface based on an expected position of the pair of stereoscopic three-dimensional glasses relative to the viewing surface such that the observer wearing the pair of stereoscopic three-dimensional glasses perceives the stereoscopic three-dimensional images displayed by the image display assembly on the viewing surface, wherein the expected position of the pair of stereoscopic three-dimensional glasses relative to the viewing surface is based on the position of the observer position guide.

Preferably, the image display assembly is arranged to display stereoscopic three-dimensional images on a plurality of viewing surfaces. Preferably, the pair of stereoscopic three-dimensional glasses worn by the observer to perceive the stereoscopic three-dimensional images displayed by the image display assembly on each of the plurality of viewing surfaces. Preferably, the image generation assembly is coupled to the image display assembly, wherein the image generation assembly is configured to control the image display assembly to display a stereoscopic three-dimensional image on each of the plurality of viewing surfaces based on an expected position of the pair of stereoscopic three-dimensional glasses relative to each of the plurality of viewing surfaces such that the observer wearing the pair of stereoscopic three-dimensional glasses perceives the stereoscopic three-dimensional images displayed by the image display assembly on each of the plurality of viewing surfaces, wherein the expected position of the pair of stereoscopic three-dimensional glasses relative to each of the plurality of viewing surfaces is based on the position of the observer position guide.

Preferably, the image generation assembly is configured to control the image display assembly to display the stereoscopic three-dimensional images based on an expected position of the pair of stereoscopic three-dimensional glasses relative to the viewing surfaces and synchronised to a current position of the observer position guide such that the observer wearing the pair of stereoscopic three-dimensional glasses while moving about the stereoscopic three-dimensional images and being adjacent the current position of the observer position guide perceives the stereoscopic three-dimensional image displayed by the image display assembly on the viewing surface.

Preferably, the image generation assembly is configured to control the image display assembly to display a stereoscopic three-dimensional image on the viewing surface based on an expected position and an expected observation angle of the pair of stereoscopic three-dimensional glasses relative to the viewing surface such that the observer wearing the pair of stereoscopic three-dimensional glasses perceives the stereoscopic three-dimensional images displayed by the image display assembly on the viewing surface, wherein the expected position and the expected observation angle of the pair of stereoscopic three-dimensional glasses relative to the viewing surface is based on the position of the observer position guide.

Preferably, the viewing surface is located at a fixed point. Preferably, the observation angle is based on an angle between the viewing surface and the current position of the observer position guide.

Preferably, one or more portions of each stereoscopic three-dimensional image is displayed based on an expected position of the pair of stereoscopic three-dimensional glasses relative to each of the plurality of viewing surfaces.

Preferably, each of the plurality of viewing surfaces is adjacent another of the plurality of viewing surfaces. Preferably, at least one of the plurality of viewing surfaces is arranged at an angle relative to an adjacent viewing surface. Preferably, the angle is greater than 0° and less than 90°.

Preferably, the system further comprises a housing or structure having the plurality of viewing surfaces located therein. Preferably, the housing or structure includes an entry and/or an exit for receiving observers to allow observers to enter the housing or structure.

Preferably, the image display assembly comprises a projector assembly. Alternatively, or additionally, each viewing surface of the image display assembly comprises a display panel.

Preferably, the display panel comprises an LED display or LED panel configured to display stereoscopic three-dimensional images.

In an aspect, the invention provides a three-dimensional image display system, the display system comprising:

an observer position guide configured to guide an observer to a position to perceive a three-dimensional image;

a projector assembly arranged to project stereoscopic three-dimensional images onto a viewing surface;

a pair of stereoscopic three-dimensional glasses worn by the observer to perceive the stereoscopic three-dimensional images projected by the projector assembly onto the viewing surface; and an image generation assembly coupled to the projector assembly, the image generation assembly configured to control the image display assembly to display the stereoscopic three-dimensional images based on an expected position of the pair of stereoscopic three-dimensional glasses relative to the viewing surface such that the observer wearing the pair of stereoscopic three-dimensional glasses perceives the stereoscopic three-dimensional image displayed by the image display assembly on the viewing surface, wherein the expected position of the pair of stereoscopic three-dimensional glasses relative to the viewing surface is based on the position of the observer position guide.

Preferably, the observer position guide comprises a marker or indicator. Preferably, the observer position guide moves along a path. Preferably, a plurality of lights arranged along the path, wherein the plurality of lights are illuminated in a sequence to indicate the path the observer is to follow. Preferably, the observer position guide comprises a strip of light emitting diodes or a plurality of light emitting diodes.

In some alternative embodiments, the observer position guide comprises a moving object configured to move along the path and guide the observer. Preferably, the moving object comprises a moving vehicle or robot configured to move along the path and guide the observer.

Preferably, the image display assembly comprises a plurality of display panels.

Preferably, the projector assembly comprises a plurality of projectors. Preferably, the system comprises a plurality of pairs of 3D stereoscopic glasses corresponding to the plurality of projectors.

Preferably, the system further comprises an image separation arrangement to present images from each projector to a corresponding pair of three-dimensional stereoscopic glasses whereby an observer using one of the pairs of three-dimensional stereoscopic glasses sees images emanating from a corresponding projector only.

Preferably the image separation arrangement includes two or more filters for separating images from the plurality of projectors wherein the different viewing filters have different visible light spectral transmission characteristics. In a preferred embodiment of the invention the filters comprise interference filters. For example, the filters may comprise films of dichroic material.

Preferably the filters of the image separation arrangement comprise corresponding viewer and projector interference filters, wherein a viewer interference filter is mounted to the stereo 3D glasses for the user and projector interference filters are mounted to projectors of the corresponding set of projectors.

In another aspect, the invention provides a method for displaying a three-dimensional image, the method comprising:

providing an observer position guide which indicates a position for an observer to see a three-dimensional image displayed by an image display assembly on a viewing surface;

providing a pair of stereoscopic three-dimensional glasses to be worn by the observer to perceive stereoscopic three-dimensional images displayed by the image display assembly on the viewing surface; and displaying three-dimensional images on the viewing surface, wherein the three-dimensional images displayed on the viewing surface are based on an expected position of the pair of stereoscopic three-dimensional glasses relative to the viewing surface such that the observer wearing the pair of stereoscopic three-dimensional glasses perceives the stereoscopic three-dimensional image displayed by the image display assembly on the viewing surface, wherein the expected position of the pair of stereoscopic three-dimensional glasses relative to the viewing surface is based on the position of the observer position guide.

In another aspect, the invention provides a method for displaying a three-dimensional image, the method comprising:

providing an observer position guide which indicates a position for an observer to see a three-dimensional image generated by a projector assembly on a viewing surface;

providing a pair of stereoscopic three-dimensional glasses to be worn by the observer to perceive stereoscopic three-dimensional images projected by the projector assembly onto the viewing surface; and projecting three-dimensional images onto the viewing surface, wherein the three-dimensional images projected onto the viewing surface are based on an expected position of the pair of stereoscopic three-dimensional glasses relative to the viewing surface such that the observer wearing the pair of stereoscopic three-dimensional glasses perceives the stereoscopic three-dimensional image displayed by the image display assembly on the viewing surface, wherein the expected position of the pair of stereoscopic three-dimensional glasses relative to the viewing surface is based on the position of the observer position guide.

In an aspect, the invention provides a three-dimensional image display system, the display system comprising:

an observer position guide configured to guide an observer to a position to perceive a three-dimensional image;

an image display assembly arranged to display stereoscopic three-dimensional images on a viewing surface;

a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display the stereoscopic three-dimensional images based on an expected position of the pair of stereoscopic three-dimensional glasses relative to the viewing surface such that the observer wearing the pair of stereoscopic three-dimensional glasses perceives the stereoscopic three-dimensional image displayed by the image display assembly on the viewing surface, wherein the expected position of the pair of stereoscopic three-dimensional glasses relative to the viewing surface is based on the position of the observer position guide.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
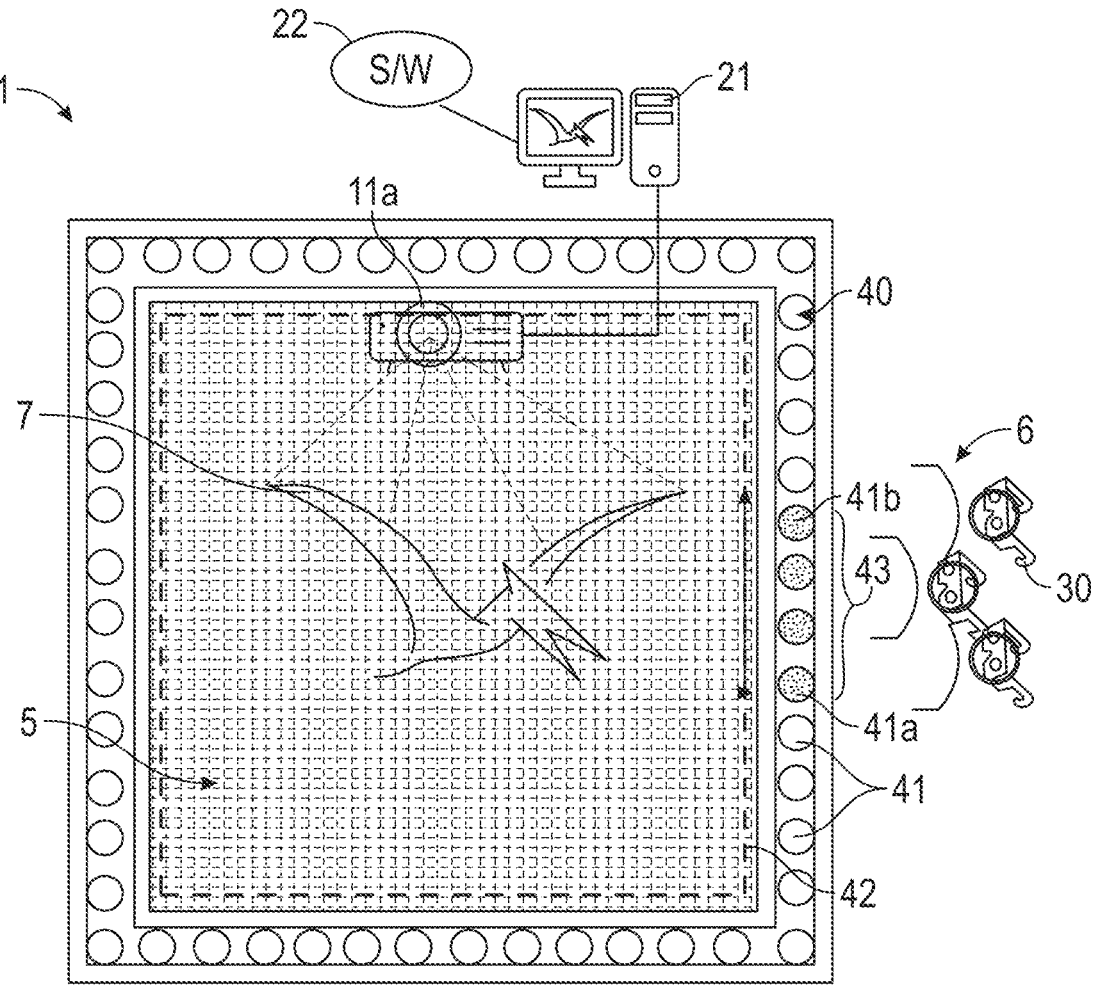
FIG. 1 illustrates a three-dimensional image display system for one or more observers to view the same three-dimensional image from a position indicated by an observer position guide.
Figure 1A:
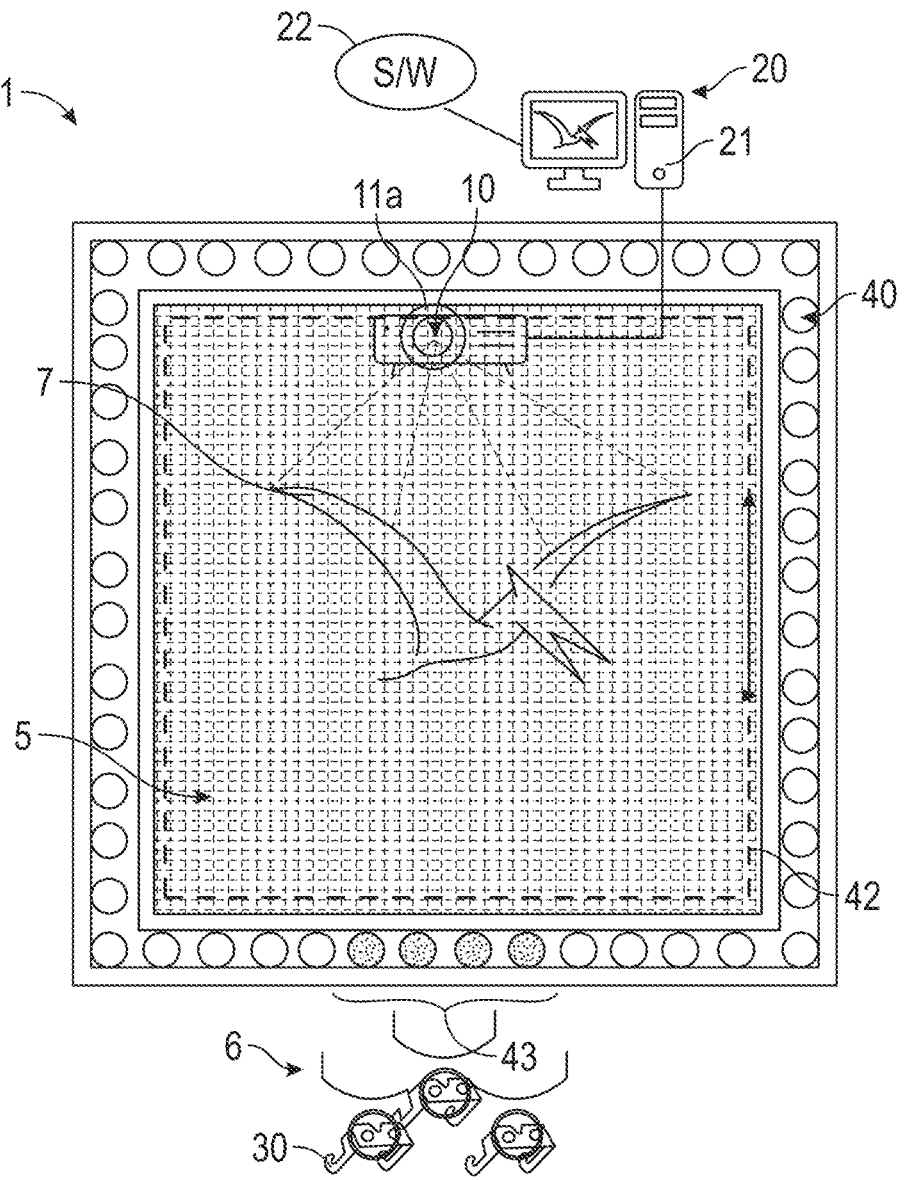
FIG. 1A illustrates the observers from FIG. 1 observing the same object depicted in a three-dimensional image from a different location as guided by the observer position guide.
Figure 2:
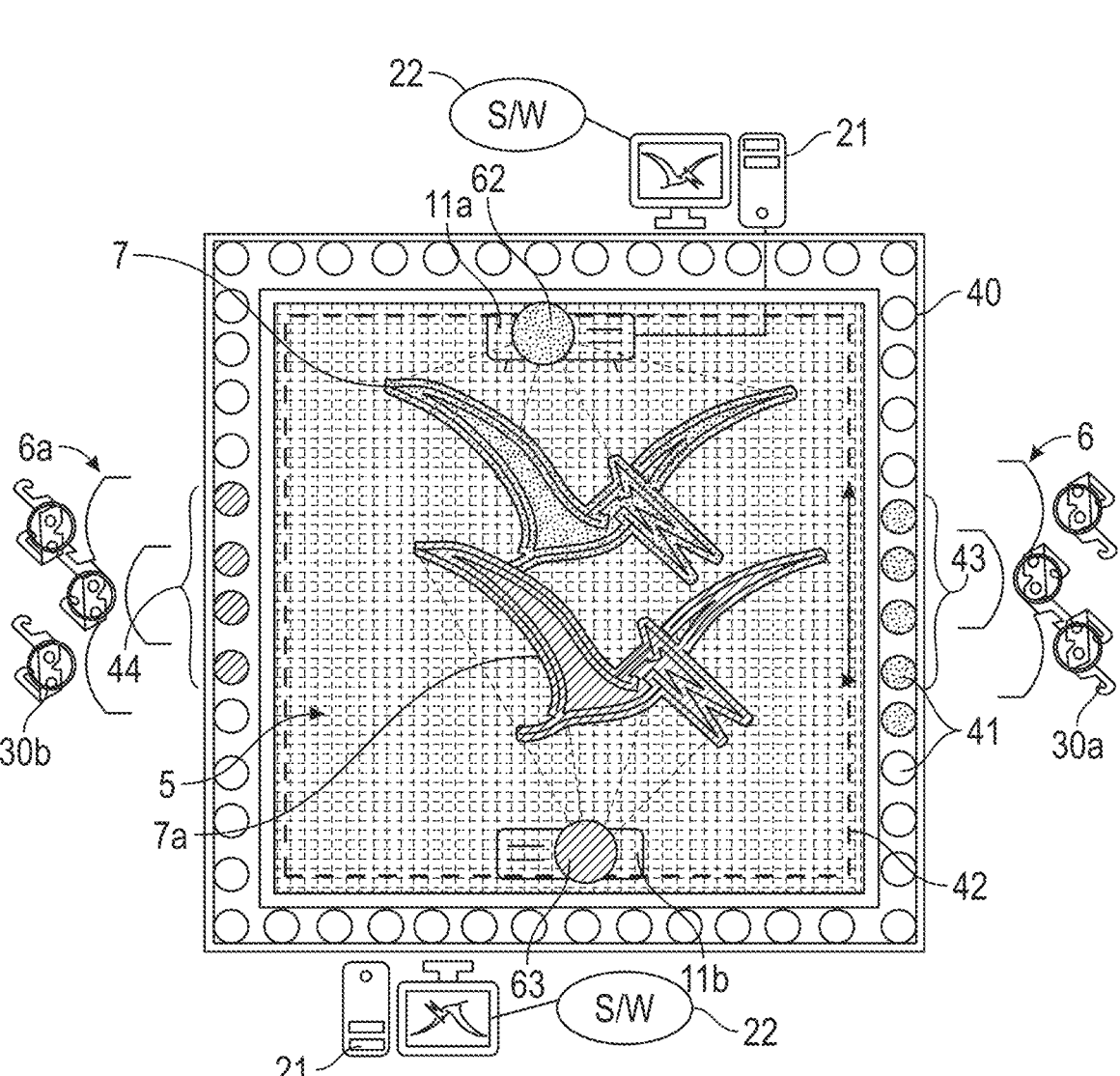
FIG. 2 illustrates a variation of the system depicted in FIG. 1 wherein the images that are generated for two different groups of observers at different locations about the three-dimensional images are produced by two projectors.
Figure 3:
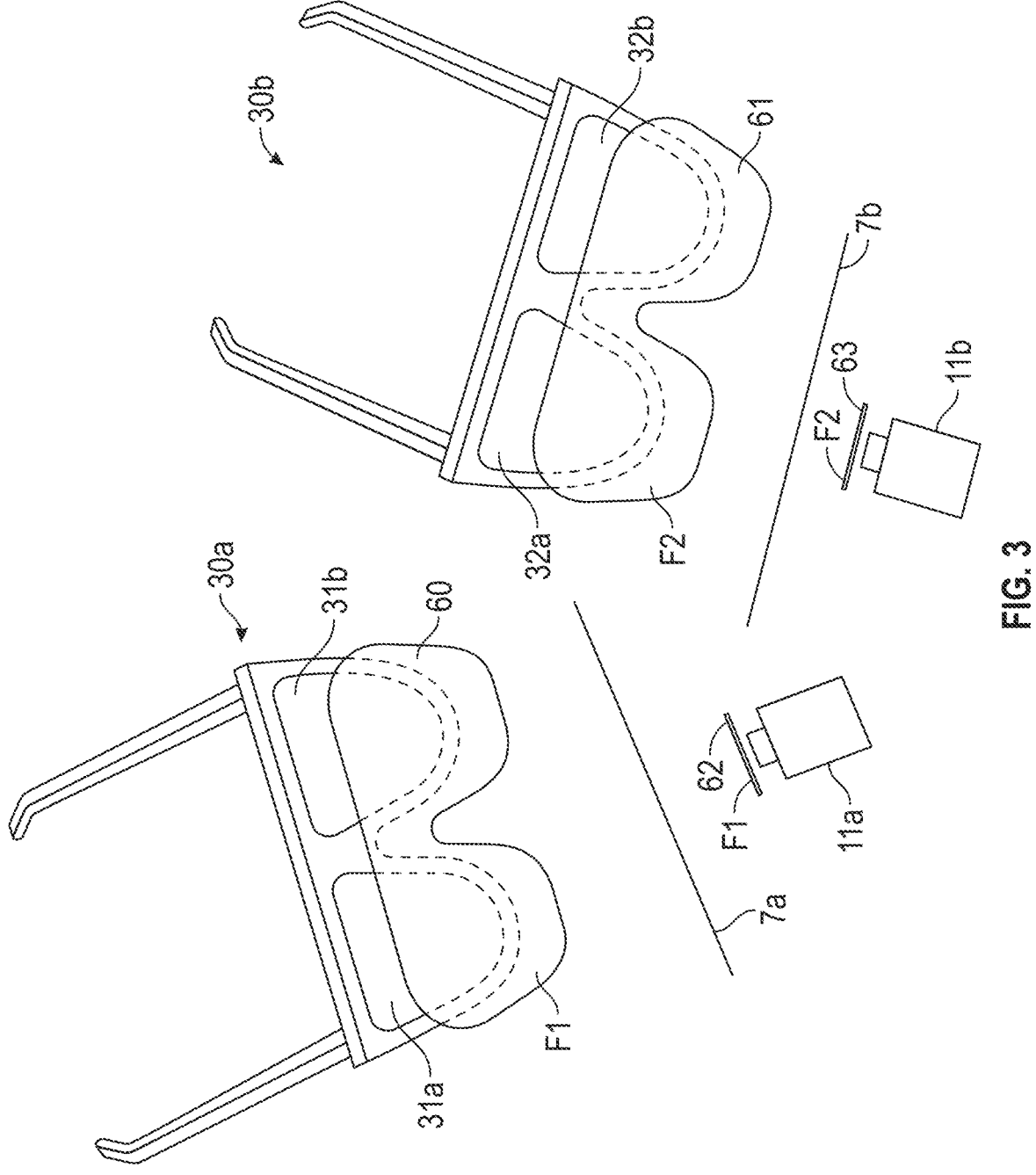
FIG. 3 illustrates an image separation arrangement applied to the projectors and 3D glasses of FIG. 2 to allow the groups of observers to view the same object from different positions.

FIGS. 1 to 3 illustrate a three-dimensional image display system 1 that presents optimal three-dimensional images to an observer or multiple observers who are moving about the three-dimensional image without the need to track the observers.

Referring now to FIG. 1, there is depicted a three-dimensional image display system 1 according to a preferred embodiment of the present invention. The system 1 comprises an observer position guide 40 (described below) configured to guide an observer wearing stereoscopic three-dimensional glasses to a position to perceive a three-dimensional image, wherein the observer position guide moves along a path.

The display system 1 includes a viewing surface in the form of screen 5, an image display assembly in the form of a projector assembly 10, an image generation assembly 20 coupled to the projector assembly 10 and a pair of stereoscopic 3D glasses 30 worn by an observer 6 to perceive stereoscopic 3D images 7 projected by a projector assembly 10 onto the screen 5.

The image display assembly as described herein refers to any technology suitable for displaying, generating, projecting or otherwise visually rendering a stereoscopic three-dimensional image. For example, the image display assembly may comprise one or more projectors projecting onto a surface or a digital screen, such as an LED display or the like.

The projector assembly 10 comprises a digital projector 11a (such as a short throw laser projector) in digital communication with the image generation assembly which comprises a digital image source in the form a computer 21 that is programmed with a software product 22. In the presently described preferred embodiment the software product 22 is comprised of instructions that are executable by one or more processors of the computer 21 for controlling the digital projector 11a to project stereoscopic images from a digital image onto the screen 5. The stereoscopic images comprise two offsets images of an object to be displayed in 3D.

The display system 1 also includes an observer position guide 40 configured to indicate a desired position for an observer 6 to see an optimal three-dimensional image generated by the projector 11a of the projector assembly 10, wherein the observer position guide 40 moves along a path 42 about the projected three-dimensional image 7 to guide the observer 6.

In the illustrated embodiment, the observer position guide 40 comprises a pre-programmed set of lights 41 (such as light emitting diodes) that sequentially light up according to a timer or programmed instructions. It will be appreciated that only a subset of the set of lights 41 (the active portion 43 or illuminated portion) is active at one time, the subset comprising a leading light 41*a*, a tail light 41*b* and a set of middle lights located between the leading light 41*a* and the tail light 41*b*. As the next light in the sequence is activated creating a new leading light, the current tail light is deactivated.

The observer position guide 40 indicates to the observer 6 the optimal position required for the observer 6 to stand in order to see the optimal three-dimensional image 7 created by the projector 11*a* and effectively guides the observer along the path 42.

The lights 41 effectively form a peripheral barrier about the 3D image 7. Various image processing techniques and effects can be applied to the image 7 by software product 22 to illicit certain perceptions from the observers. For example, creating a dark border around the image 7 can create the illusion or perception of depth as though the observer is viewing the image 7 from an elevated position and looking down at the image 7.

The images projected by the projector 11*a* as controlled by the image generation assembly 20 are synchronised to the rate of movement of the observer position guide 40 such that an observer 6 wearing the pair of stereoscopic 3D glasses 30 and being adjacent the current position (i.e. active portion 43) of the observer position guide 40 sees a three-dimensional image 7 created by the stereoscopic three-dimensional images generated by the projector assembly 10.

As the observer 6 moves about the three-dimensional image 7 as guided by the observer position guide 40, the computer system 21 adjusts the views of the three-dimensional image that is delivered by the projector 11*a* accordingly. Consequently, the observer 6 sees a three-dimensional image 7 from their expected viewpoint determined by the location of the observer position guide 40.

In a further embodiment, the projector assembly 10 includes a plurality of projectors 11*a*, 11*b*. Furthermore, the system 1 further comprises a plurality of pairs of 3D stereoscopic glasses 30*a*, 30*b* corresponding to the plurality of projectors 11*a*, 11*b* and an image separation arrangement (shown in FIG. 3) to present images from each projector 11*a*, 11*b* to a corresponding pair of 3D glasses 30*a*, 30*b* whereby an observer 6, 6*a* using one of the pairs of 3D stereoscopic glasses sees images 7, 7*a* emanating from a corresponding projector 30*a*, 30*b* only. While the three-dimensional images 7, 7*a* are shown spaced apart for illustrative purposes, it should be appreciated that, in use, the images 7, 7*a* could be projected onto the same physical space as the image separation arrangement will prevent any overlap in viewing by observers 6, 6*a* unless they are wearing the corresponding glasses 30*a*, 30*b*.

Each projector 11*a*, 11*b* is synchronised to display a stereoscopic three-dimensional image that is optimally viewed at a current location of an active portion 43, 44 of the observer position guide 40. That is, projector 11*a* displays a stereoscopic three-dimensional image that is optimally viewed by an observer 6, 6*a* currently at active portion 43 (i.e. lights are on) of the observer position guide 40 and projector 11*b* displays a stereoscopic three-dimensional image that is optimally viewed by an observer currently at active portion 44 (i.e. lights are on) of the observer position guide 40. Accordingly, complex and expensive tracking technology is not required for multiple observers to view essentially the same image from different viewpoints. While the observer position guide 40 is illustrated as a set of lights that are illuminated to indicate a standing position for an observer, it will be appreciated that the observer position guide may take one of many forms. For example, the observer position guide may comprise a set of lights embedded in the floor (in the form of illuminated tiles) or a movable object (for example, a motorised vehicle or robot-simulating a tour guide) that moves around the three-dimensional image at a set speed. In another form, the observer position guide may comprise a spotlight located in the ceiling which illuminates a desired position for an observer and moves along the path to direct the observer.

Each of the glasses 30*a*, 30*b* includes first and second active shutter windows 31*a*, 31*b*, 32*a*, 32*b*, respectively. The action of the shutter windows is synchronized to the stereoscopic images generated by the corresponding projectors 11*a*, 11*b*. Active shutter stereoscopic glasses are well known and used for perceiving 3D stereoscopic images, for example from suitably equipped LCD and plasma televisions. Other types of stereoscopic systems may also be used such as differently polarized left and right windows (though these suffer from loss of 3D effect as the head is tilted) and anaglyphic windows, e.g. red/cyan windows (however anaglyphic windows typically cause a loss of colour realism).

The system 1 also includes an image separation arrangement to present images from the two or more projectors 11*a*, 11*b* to corresponding ones of the two or more users whereby each user sees images emanating from a corresponding one of said projectors 11*a*, 11*b* only.

The image separation arrangement of the presently described embodiment includes first and second interference filters 60 and 61 that fit over the shutter windows 31*a*, 31*b*, 32*a*, 32*b* respectively. The first and second interference filters 60 and 61 are formed of dichroic material and have different, orthogonal visible light spectral transmission characteristics. Filter 60, which is made of filter material F1 has a first red (R1), blue (B1), green (G1) transmission characteristic. The second interference filter 61, which is made of filter material F2 has a second red (R2), blue (B1), green (G1) transmission characteristic that is non-overlapping with the transmission characteristic of filter material F1. Consequently, light that passes through filter F1 will be entirely blocked by filter F2 and vice versa. Accordingly, the filters F1 and F2 are said to have "orthogonal" transmission characteristics.

The image separation arrangement further includes projector filters 62 of material F1 and 63 of material F2 which fit over the output lenses of the projectors 11*a* and 11*b* respectively. Consequently, light from projector 11*a* is incident upon filter 62 of material F1. Only light with wavelengths falling within the appropriate passbands of the filter material F1 passes through the filter. Accordingly, the light escaping from projector filter 62 can pass through glasses filter 60, since filters 62 and 60 are made of the same material and have the same spectral bandpasses B1, G1, R1. Furthermore, only light with wavelengths falling within appropriate passbands of the filter material F2 passes through filter 63 of the second projector 11*b*. Thus, observer 6 only sees three-dimensional image 7 emanating from projector 11*a*.

Similarly, the light escaping from projector filter 63 can pass through glasses filter 61, since filters 63 and 61 are made of the same material and have the same spectral bandpasses B2, G2, R2. However, the first glasses filter 60, which is made of material F1, will completely block light from the second projector filter 63, which is made of material F2 because transmission characteristics of the F1 and F2 filter materials are orthogonal and have no overlap. Thus, observer 6*a* only sees three-dimensional image 7*a* emanating from projector 11*b*. Therefore, the paired glasses 30*a*, 30*b* and projector lenses 60, 62 and 61, 63 serve to separate images from the projectors 11*a* and 11*b* so that only a wearer of glasses 30*a* can see image 7 from projector 11*a* whereas only a wearer of glasses 30*b* can see image 7*a* from projector 11*b*.

Whilst the preferred embodiment of the invention makes use of interference filters, namely dichroic filters 60 and 61 and projector filters 62 and 63, other arrangements are possible. For example, absorption filters may also be used.

As the first and second observers 6 and 6*a* change their viewpoints/standing positions and viewing directions as guided by their respective illuminated lights (i.e. active portions 43, 44) on the observer position guide 40, the image generation assembly 10 adjusts the views of the three-dimensional images 7 and 7*a* that are delivered by the corresponding projector 11*a*, 11*b* accordingly. Consequently, each observer 6, 6*a* sees an appropriate view of the three-dimensional image 7, 7*a* from their viewpoint as dictated by the observer position guide 40. Thus, the views of the three-dimensional for both observers 6, 6*a* will change dynamically in accordance with each observer's movements about the three-dimensional images 7, 7*a* according to the movement of the observer position guide 40 and so an optimal three-dimensional image will be perceived for both observers 6, 6*a* appropriate to their viewpoint.

It will be realized that in other embodiments of the invention the stereo 3D glasses may comprise first and second filter windows and the image separation arrangement may comprise a polarization or active shutter filter for example.

Furthermore, while it is preferred that interference filters are used anaglyph red/cyan or other colour pairs might be used for the image separation. However, interference filters are preferred since they maintain a realistic colour balance.

Figure 4:
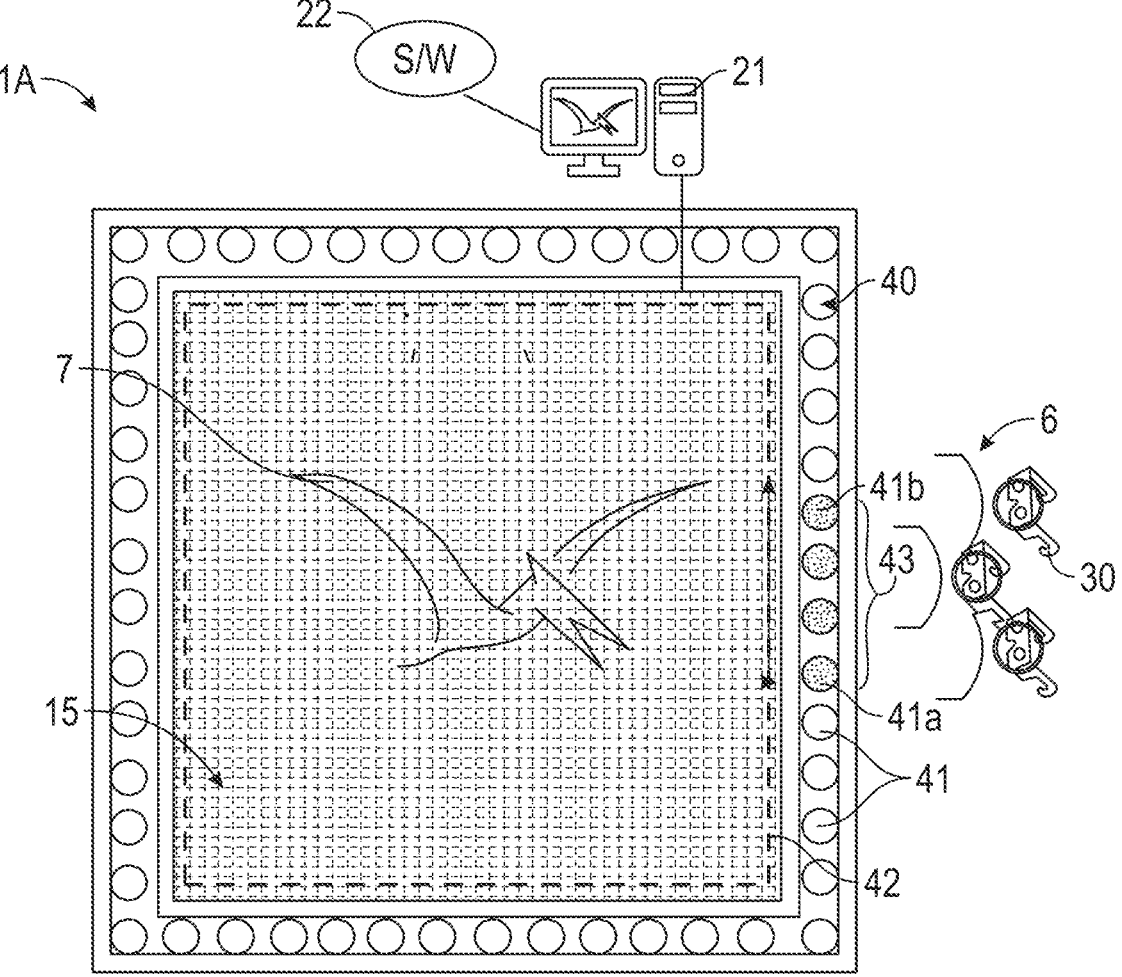
FIG. 4 illustrates an embodiment of a three-dimensional image display system for one or more observers to view the same three-dimensional image from a position indicated by an observer position guide.

FIG. 4 illustrates an embodiment of a three-dimensional image display system 1A that presents optimal three-dimensional images to an observer or multiple observers who are moving about the three-dimensional image without the need to track the observers.

In FIG. 4 there is depicted a three-dimensional image display system 1A according to a preferred embodiment of the present invention. The system 1A comprises an observer position guide 40 (described below) configured to guide an observer wearing stereoscopic three-dimensional glasses to a position to perceive a three-dimensional image, wherein the observer position guide moves along a path.

System 1A is substantially similar to system 1 described above. However, system 1A does not include a projector assembly.

Instead, the display system 1A includes an image display assembly in the form of an LED display 15, an image generation assembly 20 coupled to the LED display 15 and a pair of stereoscopic 3D glasses 30 worn by an observer 6 to perceive stereoscopic 3D images 7 displayed by the LED display 15.

The LED display 15 is in digital communication with the image generation assembly 20 which comprises a digital image source in the form a computer 21 that is programmed with a software product 22. In the presently described preferred embodiment the software product 22 is comprised of instructions that are executable by one or more processors of the computer 21 for controlling the LED display 15 to display stereoscopic images from a digital image onto the screen of the display.

The display system 1A also includes an observer position guide 40 9 as described above) configured to indicate a desired position for an observer 6 to see an optimal three-dimensional image generated by the Led display 15, wherein the observer position guide 40 moves along a path 42 about the projected three-dimensional image 7 to guide the observer 6.

The images displayed by the LED display 15 as controlled by the image generation assembly 20 are synchronised to the rate of movement of the observer position guide 40 such that an observer 6 wearing the pair of stereoscopic 3D glasses 30 and being adjacent the current position (i.e. active portion 43) of the observer position guide 40 sees a three-dimensional image 7 created by the stereoscopic three-dimensional images generated by the LED display 15.

As the observer 6 moves about the three-dimensional image 7 as guided by the observer position guide 40, the computer system 21 adjusts the views of the three-dimensional image that is delivered by the LED display 15 accordingly. Consequently, the observer 6 sees a three-dimensional image 7 from their expected viewpoint determined by the location of the observer position guide 40.

While some embodiments of the invention that have been discussed involve a system for presenting images to two observers at different locations about a screen, systems to accommodate more observers are contemplated. For example, three projectors may be used, each with one of three mutually orthogonal interference filters wherein the three observers each wear stereoscopic glasses that are fitted with one of the filters for perceiving images from one of the three projectors similarly fitted with a corresponding filter.

Advantageously, three-dimensional images can be provided to an observer (or multiple observers) that is moving about the three-dimensional image without the need for complex and expensive tracking equipment to ensure the observer maintains perception of the three-dimensional image.

FIGS. 5 to 11 illustrate a three-dimensional image display system 2 that presents optimal three-dimensional images to an observer or multiple observers who may be either stationary or moving about the three-dimensional image without the need to track the observers.

Figure 5:
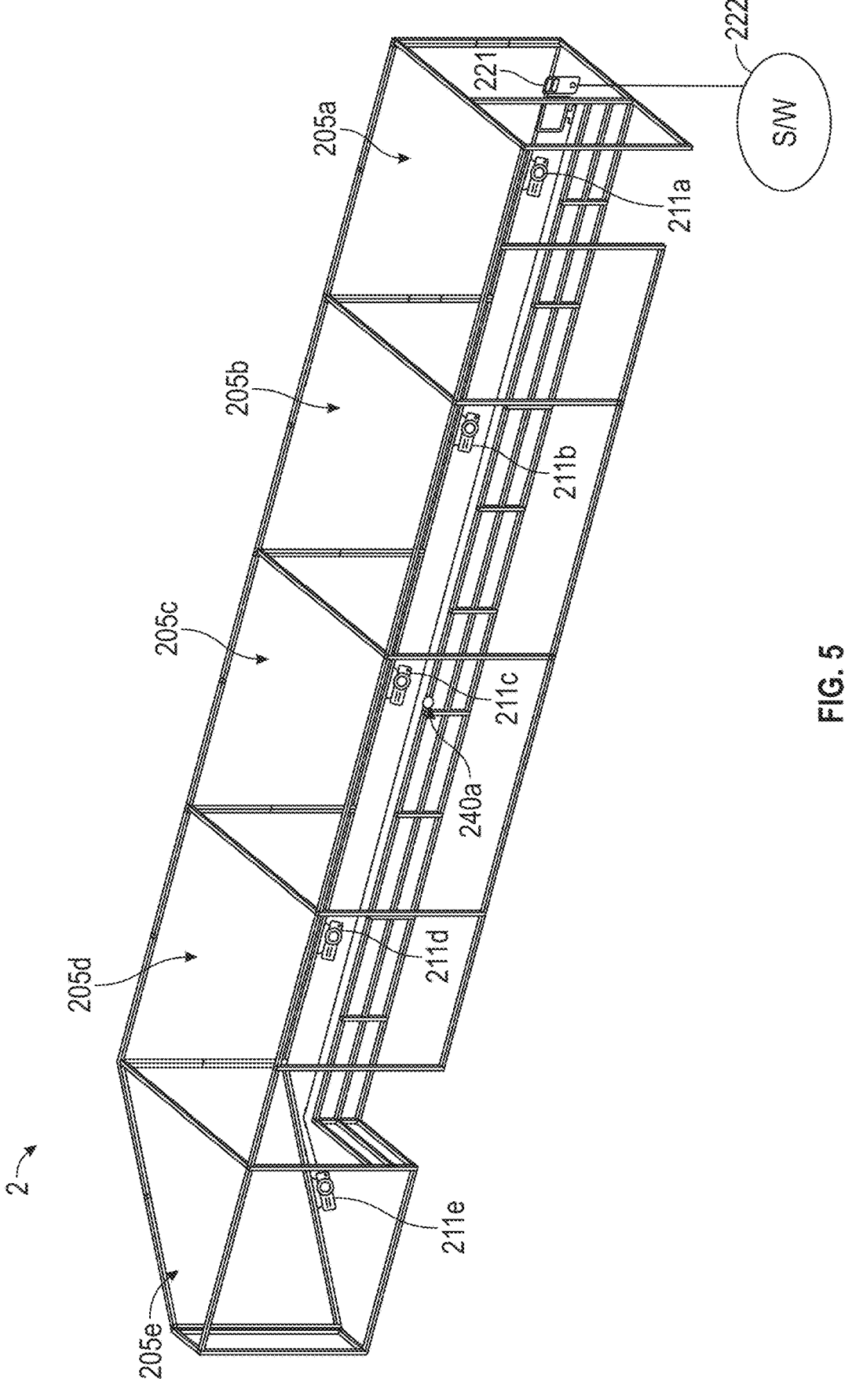
FIGS. 5 and 6 illustrate a three-dimensional image display system for one or more observers to view the same three-dimensional image from a fixed position and observation angle indicated by an observer position guide.

Referring now to FIG. 5, there is depicted a three-dimensional image display system 1 according to a preferred embodiment of the present invention. The system 2 comprises an observer position guide 240 (described below) configured to guide an observer wearing stereoscopic three-dimensional glasses to a position to perceive a three-dimensional image in its optimal form. The observer position guide may be either stationary (see FIG. 5) or mobile (see FIG. 7) where the observer position guide moves along a path.

The display system 2 includes a plurality of viewing surfaces in the form of screens 205*a-e*, an image display assembly in the form of a projector assembly 210, an image generation assembly 220 coupled to the projector assembly 210 and a pair of stereoscopic 3D glasses 230 worn by an observer 206 to perceive stereoscopic 3D images 207*a-e* projected by a projector assembly 10 onto the screens 205*a-e*, respectively.

As shown in the illustrations, the screens 205*a-e* are arranged such that each viewing surface is adjacent another viewing surface. This allows moving images to move seamlessly from one viewing surface to another adjacent viewing surface, thereby giving the appearance of a single, elongate display. Screens 205*a-d* are arranged end to end in a straight line while screen 205*e* is arranged at angle of approximately 45° relative to screen 205*d*. Screen 205*e* could be arranged at an angle of anywhere between 0° and 90° relative to screen 205d. Multiple screens could also be angled relative to other screens.

It will be appreciated that while five projection screens (i.e. viewing surfaces are shown), a single, elongate viewing surface could be provided which receives projected images from each projector of the image display assembly thereon.

The system 2 also includes a housing or structure in the form of an elongate hallway 270 having the plurality of viewing surfaces located therein. The elongate hallways 270 includes an entry 271 and an exit 272 for receiving observers to allow observers to enter and exit the elongate hallway 270.

The image display assembly as described herein refers to any technology suitable for displaying, generating, project-ing or otherwise visually rendering a stereoscopic three-dimensional image. For example, the image display assem-bly may comprise one or more projectors projecting onto a surface or a digital screen, such as an LED display or the like.

The projector assembly 210 comprises a plurality of digital projectors 211a-e (such as a short throw laser pro-jector), one projector for each screen 205a-e, in digital communication with the image generation assembly which comprises a digital image source in the form of a computer 221 that is programmed with a software product 222.

In the presently described preferred embodiment the software product 222 is comprised of instructions that are executable by one or more processors of the computer 221 for controlling the digital projectors 211a-e to project ste-reoscopic images from a digital image onto the screens 205a-e. The stereoscopic images comprise two offsets images of an object to be displayed in 3D. The stereoscopic images may be either pre-loaded onto the computer 221 or the software product 222 may be configured to generate the stereoscopic images.

The display system 2 also includes an observer position guide 240 configured to indicate a desired position for an observer 206 to see an optimal three-dimensional image generated by the projectors 211a-e of the projector assembly 210. The observer position guide 240 may indicate a single, stationary point for an observer to be positioned (as shown in FIGS. 5 and 6) or move along a path 242 about the projected three-dimensional image 207a-e to guide the observer 206 as shown in FIG. 6.

In the illustrated embodiments of FIGS. 5 to 10, the observer position guide 240 comprises a light that acts as a marker that the observer stands over or near.

Figure 6:
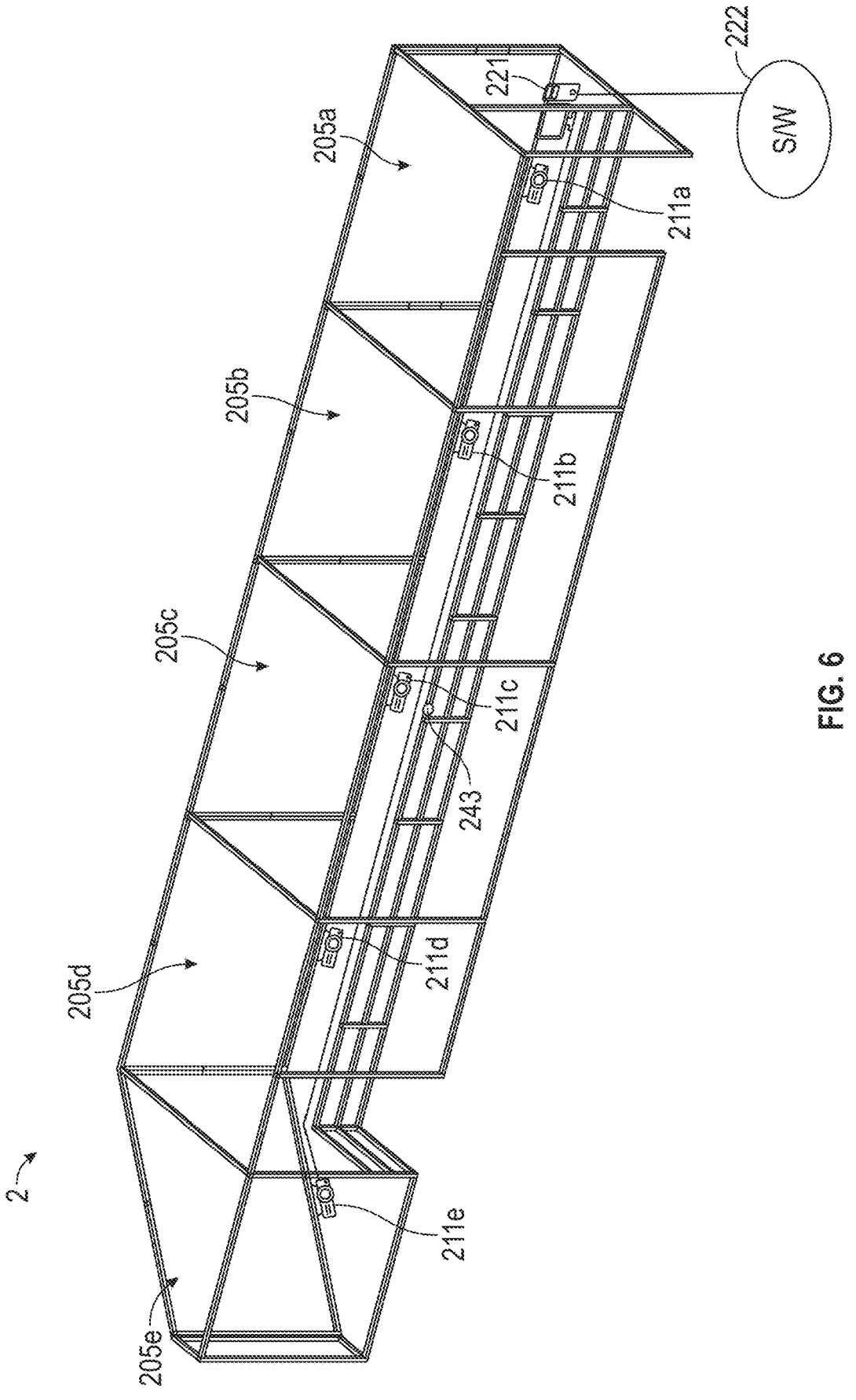
Figure 7:
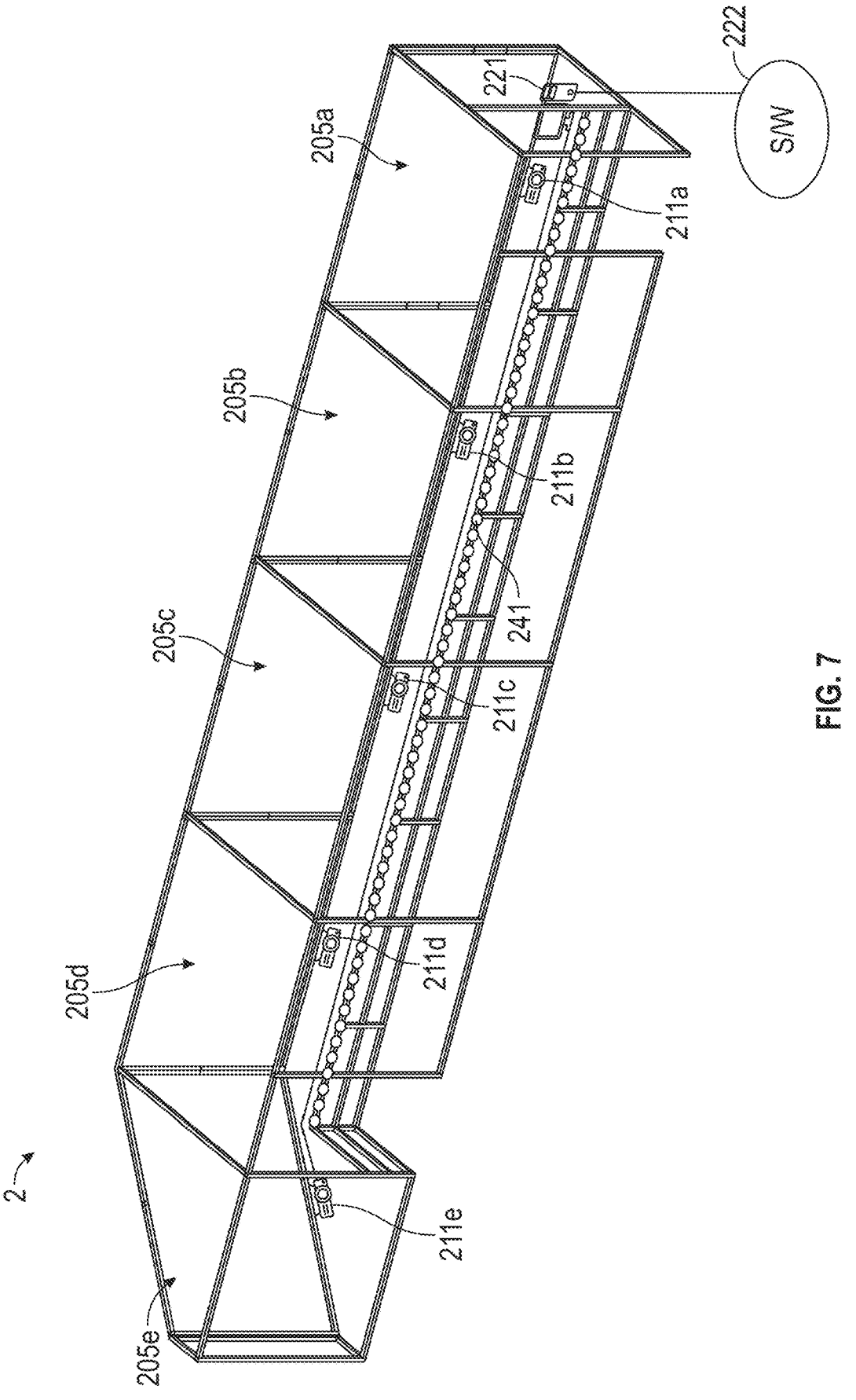
FIGS. 7 to 10 illustrate a three-dimensional image display system for one or more observers to view the same three-dimensional image from a moving position and observation angle indicated by an observer position guide.
Figure 8:
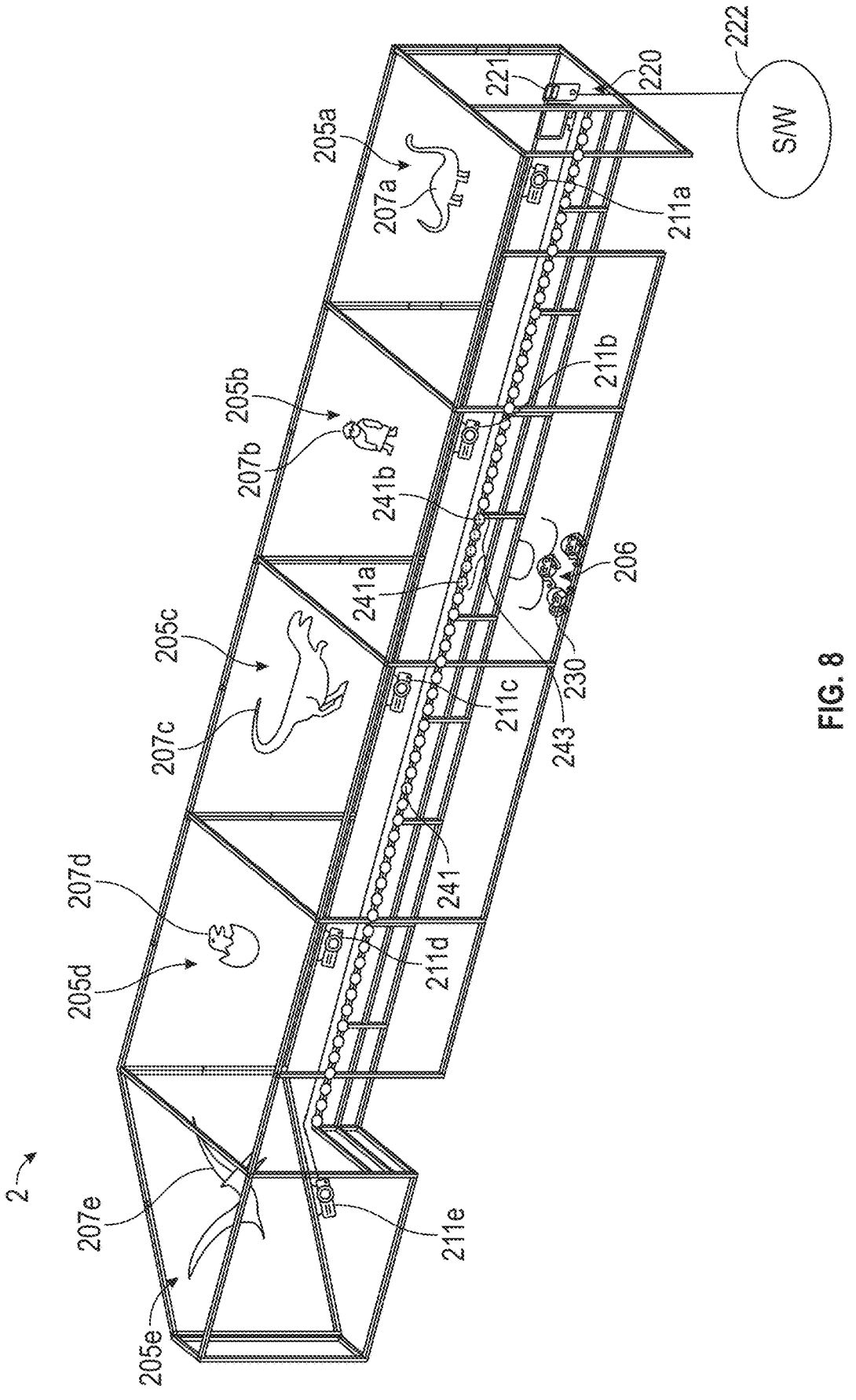
Figure 9:
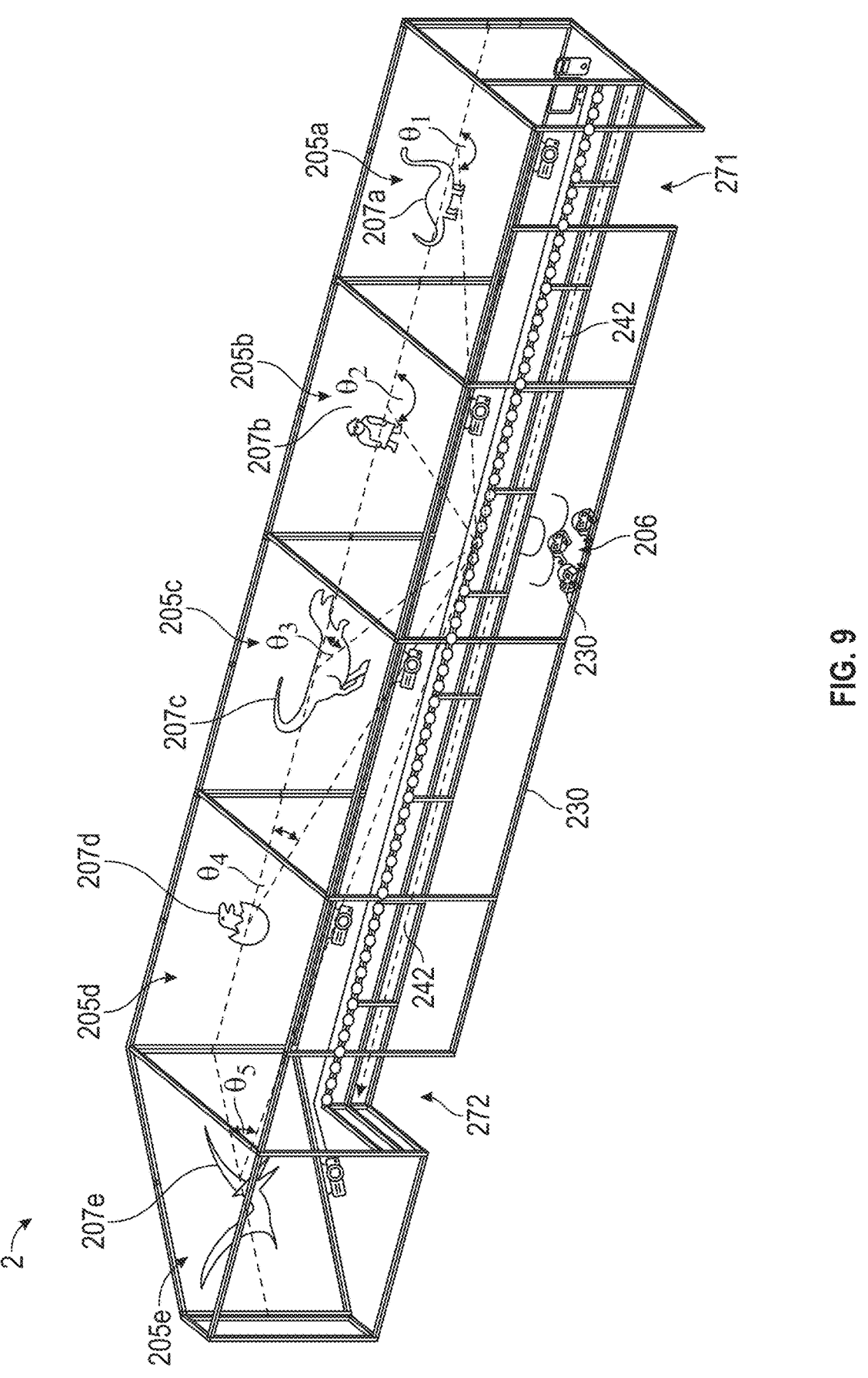
Figure 10:
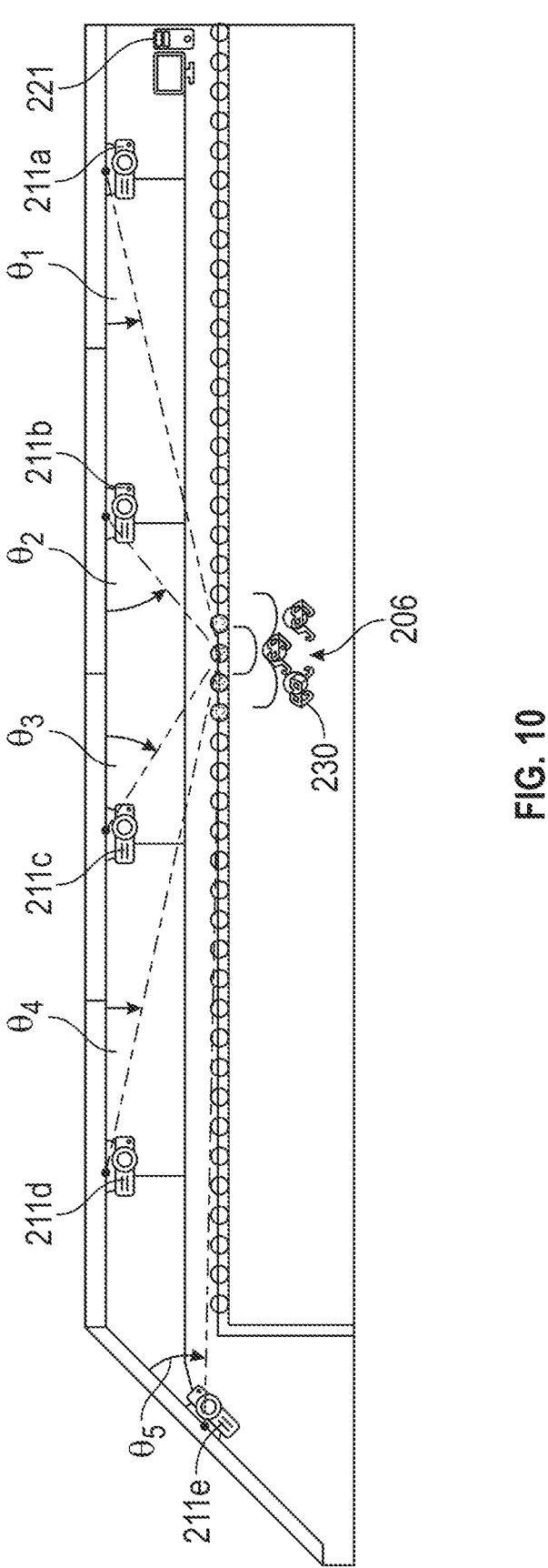

In the embodiment shown in FIGS. 5 and 6, the observer position guide 240 takes the form of a single stationary marker 240a (e.g. a light) that indicates the approximate position that allows an observer (or observers) to perceive the optimal three-dimensional images.

In the embodiment shown in FIGS. 7 to 10, the observer position guide 240 takes the form of a pre-programmed set of lights 241 (such as light emitting diodes) that sequentially light up according to a timer or programmed instructions. It will be appreciated that only a subset of the set of lights 241 (the active portion 243 or illuminated portion) is active at one time, the subset comprising a leading light 241a, a tail light 241b and a set of middle lights located between the leading light 241a and the tail light 241b. As the next light in the sequence is activated creating a new leading light, the current tail light is deactivated. The lights 241 effectively form a barrier along the screens 205a-e.

In both embodiments described above, the observer posi-tion guide 240 indicates to the observer 206 the optimal position required for the observer 206 to stand in order to see the optimal three-dimensional images 207a-e created by the projectors 211a-e and effectively guides the observer along the path 242.

Various image processing techniques and effects can be applied to the image 207a-e by software product 222 to illicit certain perceptions from the observers. For example, creating a dark border around the image 207a-e can create the illusion or perception of depth as though the observer is viewing the image 207a-e from an elevated position and looking down at the image 207a-e.

The images projected by the projectors 211a-e as con-trolled by the image generation assembly 220 are displayed based on an expected position (which may include an expected observation angle $\theta_1$-$\theta_5$) of the pair of stereoscopic three-dimensional glasses relative to the viewing surfaces such that the observer wearing the pair of stereoscopic three-dimensional glasses perceives each of the stereoscopic three-dimensional images displayed by the image display assembly on the viewing surfaces. The expected position (and in relevant embodiments, the expected observation angle) of the pair of stereoscopic three-dimensional glasses relative to each of the viewing surfaces is based on the position of the observer position guide. More particularly, the expected position of the pair of stereoscopic three-dimensional glasses relative to each of the viewing surfaces is based on the position of the observer position guide relative to a fixed position of each viewing surface.

The expected observation angle is based on an angle between each viewing surface and the current position of the observer position guide. In particular embodiments, the angle between each viewing surface and the current position of the observer position guide may be measured from a centrepoint of the respective viewing surface and a cen-trepoint of the current position of the observer position guide (e.g. the centre of the middle active light). Each viewing surface is located at a fixed, known position which allows the angle between each viewing surface (as set out above) and the current position of the observer position guide to be determined. The expected observation angle may also include correction factors accounting for an average distance between the position of the observer position guide and an observer, and the height of the observer (e.g. using an average height) relative to the observer position guide.

In use, the software product 222 controls the digital projectors 211a-e, via the computer 221, to project stereo-scopic images from a digital image onto the screens 205a-e according to the expected position of the stereoscopic three-dimensional glasses and, in some embodiments, the expected observation angle, relative to each of the screens 205a-e. The position and observation angle of the stereo-scopic three-dimensional glasses is known from the fixed location of the observer position guide.

The arrangement of the screens 205a-e and the travel path provides a panoramic experience for the observer. This allows the observer to be provided with a view akin to being in an aquarium or behind a large window. However, due to the three-dimensional effects, the images appear to extend beyond or through the window as though the objects in the images are reaching towards the observer.

Embodiments of the invention allow multiple three-di-mensional images to be provided at significant distances apart from each other while still allowing the observer to perceive each image as a three-dimensional image without unwanted warping or bending.

In some embodiments, one or more portions of each stereoscopic three-dimensional image is displayed based on an expected position of the pair of stereoscopic three-dimensional glasses relative to the viewing surface. This may be embodied by dividing images into vertical slices where each vertical slice is determined from and displayed based on an expected position of the pair of stereoscopic three-dimensional glasses relative to each viewing surface.

In embodiments having a set of lights, the images projected by the projectors 211*a-e* as controlled by the image generation assembly 220 are displayed based on an expected position of the pair of stereoscopic three-dimensional glasses relative to the viewing surfaces and synchronised to the rate of movement of the observer position guide 240 such that an observer 206 wearing the pair of stereoscopic 3D glasses 230 while moving about the stereoscopic three-dimensional images and being adjacent the current position of the observer position guide perceives each of the stereoscopic three-dimensional image displayed by the image display assembly on the viewing surface.

As the observer 206 moves about the three-dimensional images 207*a-e*, as guided by the observer position guide 240, the computer system 221 adjusts the views of the three-dimensional image that is delivered by the projectors 211*a-e* accordingly. Consequently, the observer 206 sees a three-dimensional image 207*a-e* according to their expected viewing position based on the location of the observer position guide 240.

Figure 11:
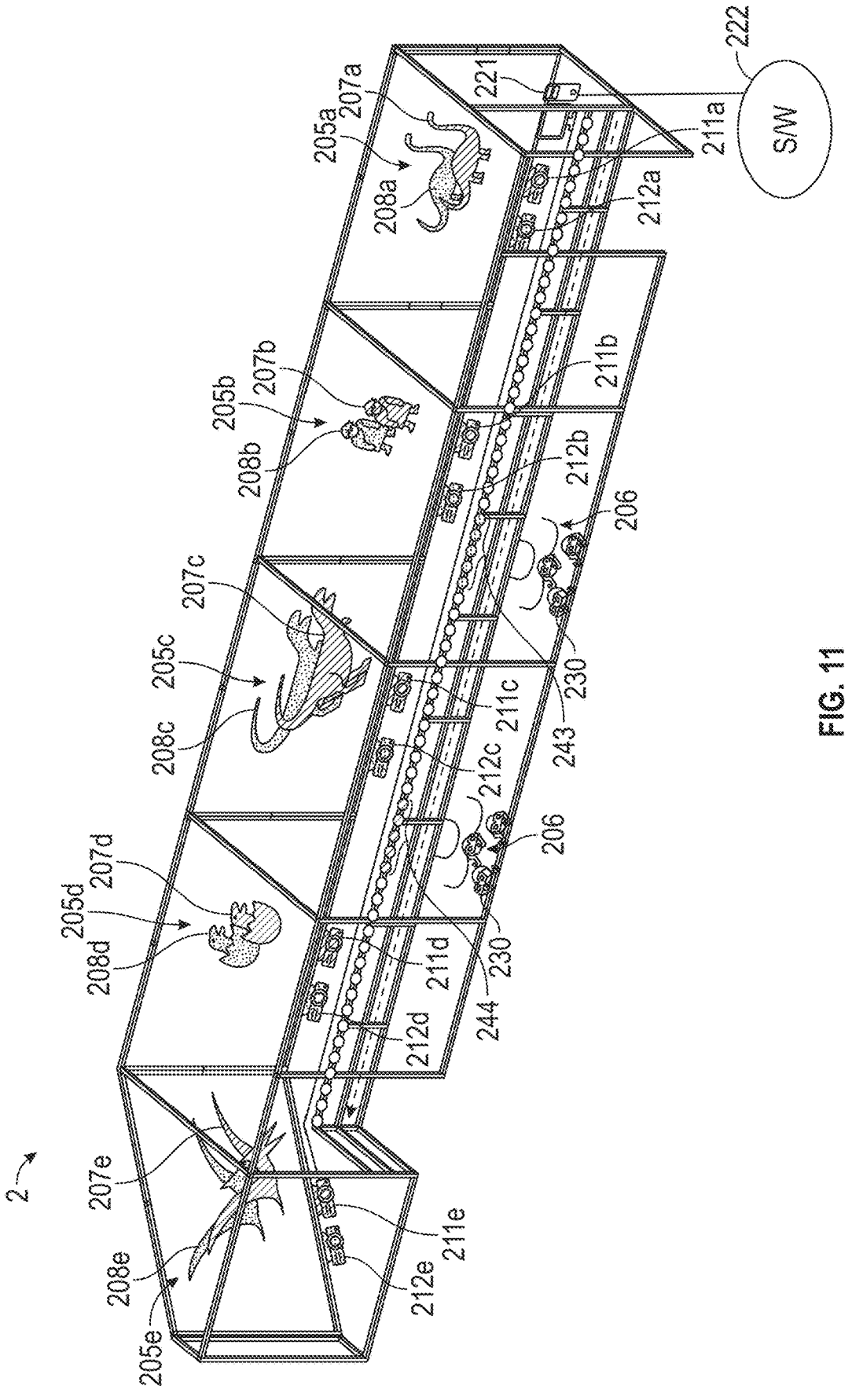
FIG. 11 illustrates a variation of the system depicted in FIG. 5 wherein the images that are generated for two different groups of observers at different locations about the three-dimensional images are produced by two projectors.
Figure 12:
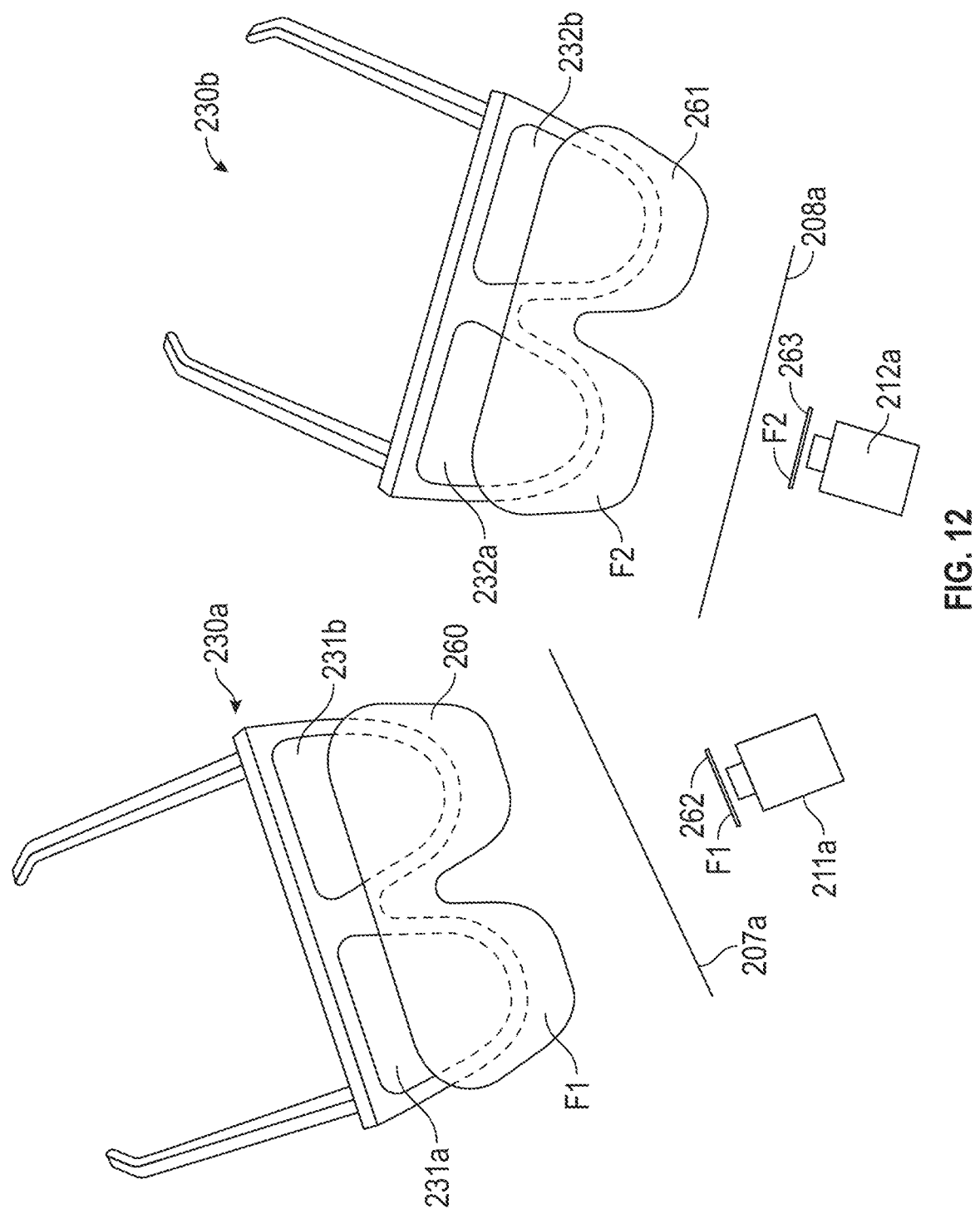
FIG. 12 illustrates an image separation arrangement applied to the projectors and 3D glasses of FIG. 10 to allow the groups of observers to view the same object from different positions.

In a further embodiment shown in FIGS. 11 and 12, the projector assembly 210 includes a second plurality of projectors 212*a-c*. Furthermore, the system 2 further comprises a plurality of pairs of 3D stereoscopic glasses 230*a*, 230*b* where the pair of 3D stereoscopic glasses 230*a* corresponds to the plurality of projectors 211*a-e* and the pair of 3D stereoscopic glasses 230*b* corresponds to the second plurality of projectors 212*a-e* and an image separation arrangement (shown in FIG. 12) to present images from each projector of the first plurality of projectors 211*a-c*, and the second plurality of projectors 212*a-e* to a corresponding pair of 3D glasses 230*a*, 230*b* whereby an observer 206, 206*a* using one of the pairs of 3D stereoscopic glasses sees images 207*a-e*, emanating from a corresponding projector 230*a*, 230*b* only. While the three-dimensional images 207*a-e*, are shown spaced apart for illustrative purposes, it should be appreciated that, in use, the images 207*a-e*, could be projected onto the same physical space as the image separation arrangement will prevent any overlap in viewing by observers 206, 206*a* unless they are wearing the corresponding glasses 230*a*, 230*b*.

Each set of the first plurality of projectors 211*a-e*, and the second plurality of projectors 212*a-e* is synchronised to display a stereoscopic three-dimensional image that is optimally viewed at a current location of an active portion 243, 244 of the observer position guide 240. That is, projectors 211*a-e* each display the stereoscopic three-dimensional images 207*a-e* that are optimally viewed by an observer 206 currently at active portion 243 (i.e. lights are on) of the observer position guide 240 and second plurality of projectors 212*a-e* each display the stereoscopic three-dimensional images 208*a-e* that are optimally viewed by an observer 206*a* currently at active portion 244 (i.e. lights are on) of the observer position guide 240. Accordingly, complex and expensive tracking technology is not required for multiple observers to view essentially the same image from different viewpoints. While the observer position guide 240 is illustrated as a set of lights that are illuminated to indicate a standing position for an observer, it will be appreciated that the observer position guide may take one of many forms. For example, the observer position guide may comprise a set of lights embedded in the floor (in the form of illuminated tiles) or a movable object (for example, a motorised vehicle or robot-simulating a tour guide) that moves around the three-dimensional image at a set speed. In another form, the observer position guide may comprise a spotlight located in the ceiling which illuminates a desired position for an observer and moves along the path to direct the observer.

Each of the glasses 230*a*, 230*b* includes first and second active shutter windows 231*a*, 231*b*, 232*a*, 232*b*, respectively. The action of the shutter windows is synchronized to the stereoscopic images generated by the corresponding first plurality of projectors 211*a-e* and second plurality of projectors 212*a-e*. Active shutter stereoscopic glasses are well known and used for perceiving 3D stereoscopic images, for example from suitably equipped LCD and plasma televisions. Other types of stereoscopic systems may also be used such as differently polarized left and right windows (though these suffer from loss of 3D effect as the head is tilted) and anaglyphic windows, e.g. red/cyan windows (however anaglyphic windows typically cause a loss of colour realism).

The system 2 also includes an image separation arrangement to present images from the first plurality of projectors 211*a-e* and the second plurality of projectors 212*a-e* to corresponding ones of the two or more users whereby each user sees images emanating from a corresponding one of said projectors of the first plurality of projectors 211*a-e* and the second plurality of projectors 212*a-e* only.

The image separation arrangement of the presently described embodiment includes first and second interference filters 260 and 261 that fit over the shutter windows 231*a*, 231*b*, 232*a*, 232*b* respectively. The first and second interference filters 260 and 261 are formed of dichroic material and have different, orthogonal visible light spectral transmission characteristics. Filter 260, which is made of filter material F1 has a first red (R1), blue (B1), green (G1) transmission characteristic. The second interference filter 261, which is made of filter material F2 has a second red (R2), blue (B1), green (G1) transmission characteristic that is non-overlapping with the transmission characteristic of filter material F1. Consequently, light that passes through filter F1 will be entirely blocked by filter F2 and vice versa. Accordingly, the filters F1 and F2 are said to have "orthogonal" transmission characteristics.

The image separation arrangement further includes projector filters 262 of material F1 and 263 of material F2 which fit over the output lenses of the projectors 211*a* and 211*b* respectively. Consequently, light from projectors 211*a-e* is incident upon filter 262 of material F1. Only light with wavelengths falling within the appropriate passbands of the filter material F1 passes through the filter. Accordingly, the light escaping from projector filter 262 can pass through glasses filter 260, since filters 262 and 260 are made of the same material and have the same spectral bandpasses B1, G1, R1. Furthermore, only light with wavelengths falling within appropriate passbands of the filter material F2 passes through filter 263 of the second projectors 212, 212*b*, 212*c*. Thus, observer 206 only sees three-dimensional images 207*a-e* emanating from projectors 211*a-c*.

Similarly, the light escaping from projector filter 263 can pass through glasses filter 261, since filters 263 and 261 are made of the same material and have the same spectral bandpasses B2, G2, R2. However, the first glasses filter 260, which is made of material F1, will completely block light from the second projector filter 263, which is made of material F2 because transmission characteristics of the F1 and F2 filter materials are orthogonal and have no overlap.

Thus, observer 206a only sees three-dimensional image 208a-e emanating from the second plurality of projectors 212a-e. Therefore, the paired glasses 230a, 230b and projector lenses 260, 262 and 261, 263 serve to separate images from the first plurality of projectors 211a-e and the second plurality of projectors 212a-e so that only a wearer of glasses 230a can see image 207a-c from the first plurality of projectors 211a-e whereas only a wearer of glasses 230b can see image 208a-e from the second plurality of projectors 212a-c.

Whilst the preferred embodiment of the invention makes use of interference filters, namely dichroic filters 260 and 261 and projector filters 262 and 263, other arrangements are possible. For example, absorption filters may also be used.

As the first observers 206 and second observers 206a change their viewpoints/standing positions and viewing directions as guided by their respective illuminated lights (i.e. active portions 243, 244) on the observer position guide 240, the image generation assembly 210 adjusts the views of the three-dimensional images 207a-e, 208a-e that are delivered by the corresponding projectors 211a-e, 212a-e accordingly. Consequently, each of the first observers 206 and second observers 206a sees an appropriate view of the three-dimensional image 207a-e, 208a-e from their viewpoint as dictated by the observer position guide 240. Thus, the views of the three-dimensional images for both the first observers 206 and second observers 206a will change dynamically in accordance with each observer's movements about the three-dimensional images 207a-e, 208a-e, according to the movement of the observer position guide 240 and so an optimal three-dimensional image will be perceived for both observers 206, 206a appropriate to their viewpoint.

It will be realized that in other embodiments of the invention the stereo 3D glasses may comprise first and second filter windows and the image separation arrangement may comprise a polarization or active shutter filter for example.

Furthermore, while it is preferred that interference filters are used anaglyph red/cyan or other colour pairs might be used for the image separation. However, interference filters are preferred since they maintain a realistic colour balance.

Figure 13:
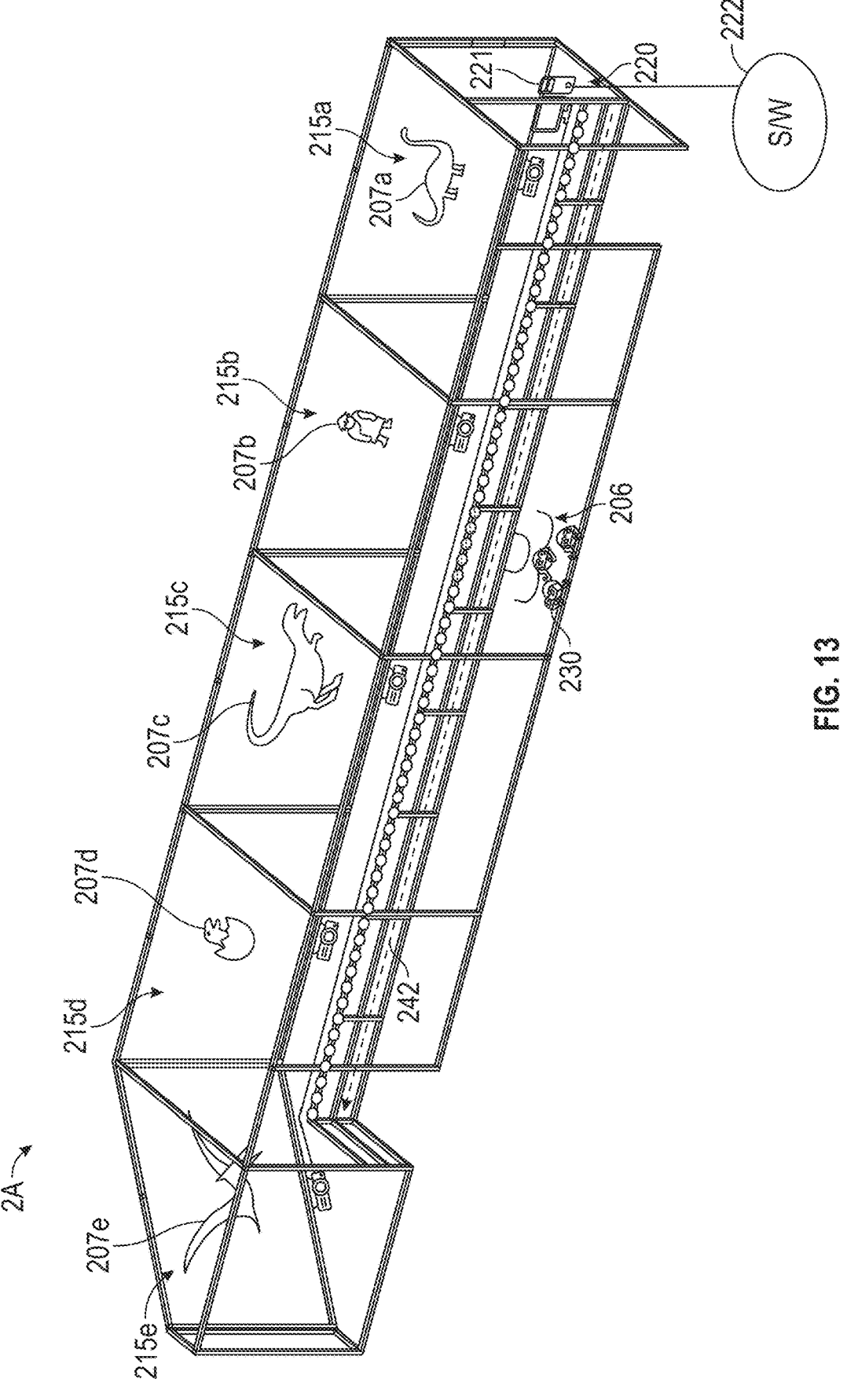
FIG. 13 illustrates an embodiment of a three-dimensional image display system for one or more observers to view the same three-dimensional image from a position indicated by an observer position guide.

FIG. 13 illustrates an embodiment of a three-dimensional image display system 2A that presents optimal three-dimensional images to an observer or multiple observers who are moving about the three-dimensional image without the need to track the observers.

In FIG. 13 there is depicted a three-dimensional image display system 2A according to a preferred embodiment of the present invention. The system 2A comprises an observer position guide 240 (described below) configured to guide an observer wearing stereoscopic three-dimensional glasses to a position to perceive a three-dimensional image, wherein the observer position guide moves along a path.

System 2A is substantially similar to system 2 described above. However, system 2A does not include a projector assembly.

Instead, the display system 2A includes an image display assembly in the form of five LED displays 215a-e, an image generation assembly 220 coupled to the LED displays 215a-e and a pair of stereoscopic 3D glasses 230 worn by an observer 206 to perceive stereoscopic 3D images 207a-e displayed by the LED displays 215a-e.

The LED displays 215a-e are in digital communication with the image generation assembly 220 which comprises a digital image source in the form a computer 221 that is programmed with a software product 222. In the presently described preferred embodiment the software product 222 is comprised of instructions that are executable by one or more processors of the computer 221 for controlling the LED displays 215a-e to display stereoscopic images from a digital image onto the screen of the display.

The display system 2A also includes an observer position guide 240 as described above) configured to indicate a desired position for an observer 206 to see an optimal three-dimensional image generated by the LED displays 215a-e, wherein the observer position guide 240 moves along a path 242 about the projected three-dimensional image 207a-e to guide the observer 206.

The images displayed by the LED displays 215a-e as controlled by the image generation assembly 220 are displayed as described above in relation to the other embodiments.

As the observer 206 moves about the three-dimensional images 207a-e as guided by the observer position guide 240, the computer system 221 adjusts the views of the three-dimensional image that is delivered by the LED displays 215a-e accordingly. Consequently, the observer 206 sees the three-dimensional images 207a-e from their expected position determined by the location of the observer position guide 240.

While some embodiments of the invention that have been discussed involve a system for presenting images to two observers at different locations about a screen, systems to accommodate more observers are contemplated. For example, three projectors may be used, each with one of three mutually orthogonal interference filters wherein the three observers each wear stereoscopic glasses that are fitted with one of the filters for perceiving images from one of the three projectors similarly fitted with a corresponding filter.

Advantageously, three-dimensional images can be provided to an observer (or multiple observers) that is moving about the three-dimensional image without the need for complex and expensive tracking equipment to ensure the observer maintains perception of the three-dimensional image.

Further advantageously, multiple three-dimensional images spaced apart along a wall can all be viewed accurately.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A three-dimensional image display system, the display system comprising:
    an observer position guide configured to guide an observer to a position to perceive a three-dimensional image;
    an image display assembly arranged to display stereoscopic three-dimensional images on a viewing surface;
    a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display the stereoscopic three-dimensional images synchronized to a current position of the observer position guide such that the observer wearing the pair of stereoscopic three-dimensional glasses being adjacent the current position of the observer position guide perceives the stereoscopic three-dimensional image displayed by the image display assembly on the viewing surface, wherein the observer position guide moves along a path.

2. The three-dimensional image display system of claim 1, wherein the observer position guide comprises a marker or indicator.

3. The three-dimensional image display system of claim 1, wherein a plurality of lights is arranged along the path and the plurality of lights are illuminated in a sequence to indicate the path the observer is to follow.

4. The three-dimensional image display system of claim 3, wherein the plurality of lights of the observer position guide comprises a strip of light emitting diodes or a plurality of light emitting diodes.

5. The three-dimensional image display system of claim 1, wherein the observer position guide comprises a moving object configured to move along the path and guide the observer.

6. The three-dimensional image display system of claim 5, wherein the moving object comprises a moving vehicle or robot configured to move along the path and guide the observer.

7. The three-dimensional image display system of claim 1, wherein the image display assembly comprises a projector assembly.

8. The three-dimensional image display system of claim 7, wherein the projector assembly comprises a plurality of projectors.

9. The three-dimensional image display system of claim 8, wherein the system comprises a plurality of pairs of 3D stereoscopic glasses, each pair of 3D stereoscopic glasses corresponding to one of the plurality of projectors.

10. The three-dimensional image display system of claim 9, wherein the system further comprises an image separation arrangement to present images from each projector to a corresponding pair of three-dimensional stereoscopic glasses wherein an observer using one of the pairs of three-dimensional stereoscopic glasses sees images emanating from a corresponding projector only.

11. The three-dimensional image display system of claim 10, wherein the image separation arrangement includes two or more filters for separating images from the plurality of projectors wherein the different viewing filters have different visible light spectral transmission characteristics.

12. The three-dimensional image display system of claim 11, wherein the filters comprise interference filters.

13. The three-dimensional image display system of claim 11, wherein the filters of the image separation arrangement comprise corresponding viewer and projector interference filters, wherein a viewer interference filter is mounted to the stereo 3D glasses for the user and projector interference filters are mounted to projectors of the corresponding set of projectors.

14. The three-dimensional image display system of claim 1, wherein the image display assembly comprises one or more display panels.

15. The three-dimensional image display system of claim 14, wherein each display panel comprises an LED display or LED panel configured to display stereoscopic three-dimensional images.

16. A method for displaying a three-dimensional image, the method comprising:

providing an observer position guide which indicates a position for an observer to see a three-dimensional image displayed by an image display assembly on a plurality of viewing surfaces, wherein the observer position guide moves along a path;

providing a pair of stereoscopic three-dimensional glasses to be worn by the observer to perceive stereoscopic three-dimensional images displayed by the image display assembly on a plurality of viewing surfaces; and displaying three-dimensional images on the viewing surface, wherein the three-dimensional images displayed on the viewing surface are based on an expected position of the pair of stereoscopic three-dimensional glasses relative to the viewing surface such that the observer wearing the pair of stereoscopic three-dimensional glasses perceives the stereoscopic three-dimensional image displayed by the image display assembly on the viewing surface, wherein the expected position of the pair of stereoscopic three-dimensional glasses relative to the viewing surface is based on the position of the observer position guide.

17. A three-dimensional image display system, the display system comprising:

an observer position guide configured to guide an observer to a position to perceive a three-dimensional image, wherein the observer position guide moves along a path;

an image display assembly arranged to display stereoscopic three-dimensional images on a viewing surface;

a pair of stereoscopic three-dimensional glasses worn by the observer to perceive the stereoscopic three-dimensional images displayed by the image display assembly on the viewing surface; and an image generation assembly coupled to the image display assembly, the image generation assembly configured to control the image display assembly to display a stereoscopic three-dimensional image on the viewing surface based on an expected position of the pair of stereoscopic three-dimensional glasses relative to the viewing surface such that the observer wearing the pair of stereoscopic three-dimensional glasses perceives the stereoscopic three-dimensional images displayed by the image display assembly on the viewing surface, wherein the expected position of the pair of stereoscopic three-dimensional glasses relative to the viewing surface is based on the position of the observer position guide.

* * * * *